Dec. 14, 1926.  
G. G. EARL  
1,611,008  
MEANS AND METHOD FOR MEASURING AND REGULATING COMPRESSIBLE FLUIDS  
Filed July 8, 1916     5 Sheets-Sheet 1

Fig. 1ª.

INVENTOR.  
George G Earl  
BY F. O. Richey  
His ATTORNEY.

Patented Dec. 14, 1926.

1,611,008

UNITED STATES PATENT OFFICE.

GEORGE GOODELL EARL, OF NEW ORLEANS, LOUISIANA, ASSIGNOR OF ONE-THIRD TO CHARLES ARTHUR BROWN, OF LORAIN, OHIO, AND ONE-THIRD TO ALBERT BALDWIN WOOD, OF NEW ORLEANS, LOUISIANA.

MEANS AND METHOD FOR MEASURING AND REGULATING COMPRESSIBLE FLUIDS.

Application filed July 8, 1916. Serial No. 108,171.

The principal object of my invention is to provide means and a method for measuring and regulating the flows of compressible fluids. I aim to measure the flow of compressible fluids by creating a flow of incompressible fluid proportional to the flow to be measured at the temperatures and pressures of the flow to be measured and bring the proportional flow to a constant temperature and pressure, and utilizing it at such temperature and pressure to operate measuring means. I aim to regulate a flow of compressible fluid by creating a flow of incompressible fluid proportional to the flow to be regulated and utilizing said proportional flow to regulate such flow.

Other objects of my invention and the invention itself will be better understood from detailed descriptions of the embodiments of the invention.

Fig. 1 shows partly diagrammatically one embodiment of my invention.

Fig. 1ª shows a modification of the apparatus of Fig. 1 shown within the broken lines.

Fig. 2 shows a second embodiment of my invention.

Fig. 2ª is a modification of the form shown in Fig. 2.

Figure 1:
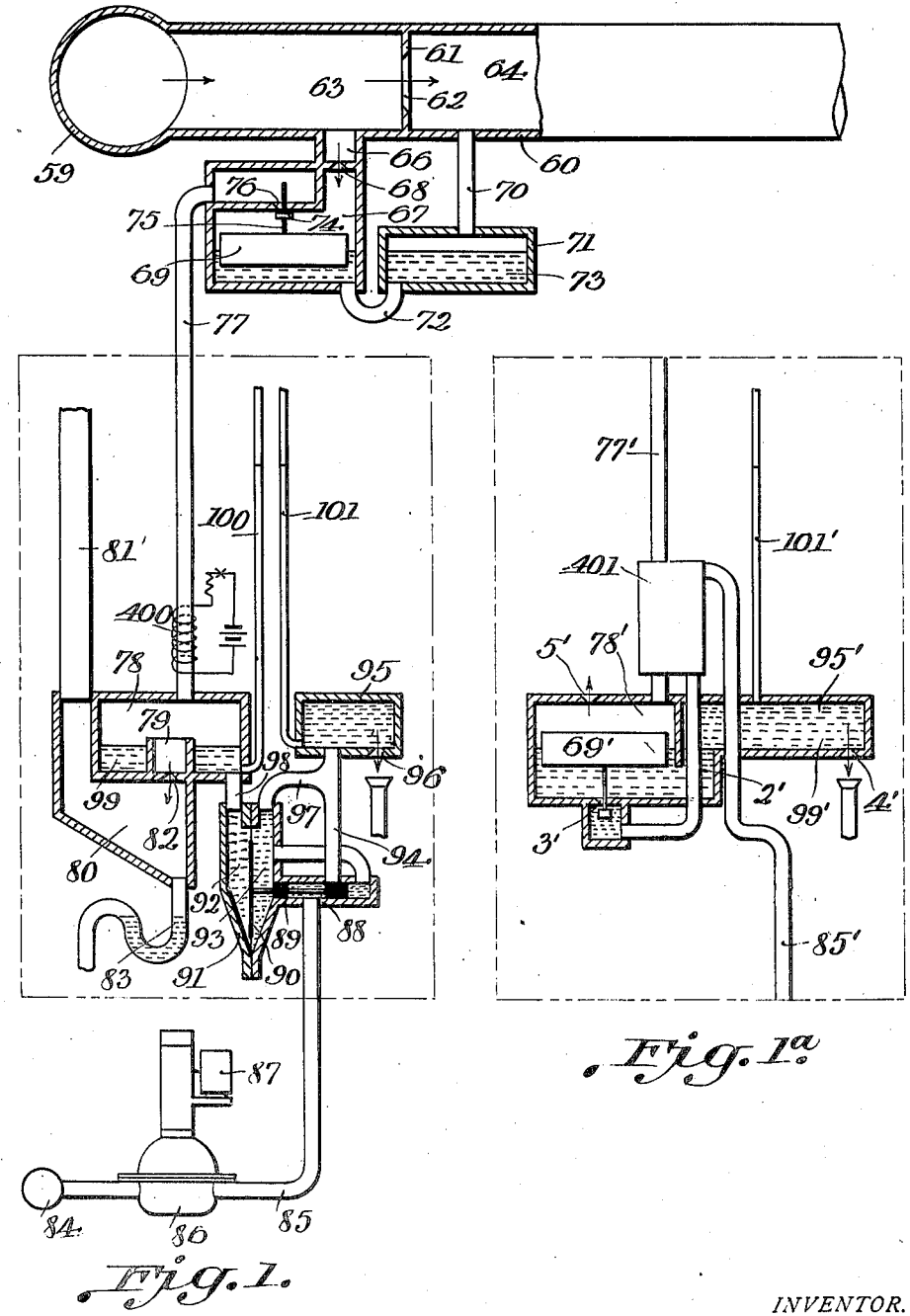

I will refer now to the drawings, and to the embodiments of my invention shown therein. First, with reference to the embodiment shown in Fig. 1, at 59 is shown a source of pressure and at 60 a conduit thru which a compressible fluid flows. At 61 is shown a web in said conduit and at 62, an orifice, which is smaller than the bore of the conduit, thus producing a restriction in the conduit and a difference in pressure on the two sides 63 and 64 thereof. A duct 66 is connected to the conduit 60 at a place on the side 63 of the orifice 62 and leads to a cell 67. An orifice 68 is provided in the duct 66. A second duct 70 leads to a second cell 71. The cells 67 and 71 are made intercommunicating. I have here shown a pipe 72 for this purpose. A quantity of liquid is shown at 73, which is in the bottom of the two cells and in the inter-communicating pipe 72. A float 69 rests on the surface of the liquid 73 in the cell 71 and controls a valve 74, which in the form shown is connected by a rod 75 to the float. The valve 74 controls an orifice 76. The fluid passing thru the duct 66 passes thru the orifice 76 and thru a third duct 77 into a chamber 78 and thence thru an opening 79 and an orifice 82 into an outer chamber 80, where it may escape to the atmosphere thru a pipe 81.

A water trap is shown at 83, thru which any water or other liquid condensing in the chamber 80 may escape. At 84 is shown a source of liquid to which is connected a duct 85. The duct 85 passes thru a device 86 which measures the liquid flowing thru the pipe 85, and which may also record and integrate the flow thru 85, a drum being shown at 87. The duct 85 enters a valve chamber 88 and the flow thru 85 is controlled by a valve 89 which in turn is controlled by a movable member 90 in the chamber 91, which is divided into cells 92 and 93. A duct 94 connects the valve chamber 88 with a cell 95, in which there is provided an orifice 96. The cells 95 and 93 are connected by a duct 97. A duct 98 connects the cells 78 and 92. A quantity of water, illustrated at 99, is placed in the cell 92, the duct 98 and the bottom of the cell 78, the level of its surface being at the level of the orifice 96. A tube 100 connects with the cell 78 below the surface of the liquid 99, and a tube 101 connects with the cell 95 below the surface of the liquid therein. The liquid in the cells rises to levels in the tubes 100 and 101, indicating the pressure therein.

The operation of the device shown in Fig. 1 is as follows: Fluid at the pressure of the fluid at 63 passes into the cell 67 and fluid at the pressure of the fluid at 64 passes into the cell 71, each acting upon the liquid 73. Liquid 73 will pass backward and forward in these cells, in response to the variations in pressure in the two cells and the float 69 will rise and fall in response to these variations in pressures, controlling the valve 74 and permitting more or less fluid to flow therethrough, in accordance with its position. When the difference in the pressures at 63 and 64 increases, the valve will be opened more and when it decreases, will be opened less, thus maintaining equal pressures in the cells 67 and 71 and proportional flows thru the orifices 68 and 62, with the result that the flow thru 77 will be proportional to the flow thru 60 and at the same temperatures and pressures. When the fluid passing thru 77 enters the chamber 78, it escapes thru 81 at a constant pressure—to wit, the atmospheric pressure. The pressure of the fluid in 78 is exerted thru the liquid 99 upon one side of the movable member 90 and always tends to move said member to the right in proportion to its pressure. The liquid in the cell 95 exerts its pressure upon the other side of the member 90, always tending to move it to the left. When the pressure in the cell 92 exceeds that in 93, the valve 89 will be operated to permit liquid to flow into the cell 95, building up a head therein and increasing the pressure until the member 90 is brought to balance. In the meantime, of course, the valve 89 has been opened and the flow thru 85 increased. When the pressure in the cell 92 drops, the reverse will be true, and the flow thru 85 will thus be maintained proportional to the flow thru the duct 60 and 77. By measuring the flow thru 85 an accurate record may be made of the quantity of flow thru 60.

It will thus be seen that instead of undertaking to measure the flow of a compressible fluid by undertaking to maintain it at a constant pressure and measuring the volume at such pressure, I have provided means for in effect measuring the weight of the gas which, for any particular gas, has a definite relation to the pressure of the gas when escaping to a constant pressure, the pressure represented in the tube 100 being the indication of the rate of weight of gas passing at all times, so that a record of said pressure, if integrated, would give the true weight of gas passing for the time covered by the integration, whereas, the integration of the pressure difference on the two sides of the orifice 62 could only have given a true weight of gas passing in event of a constant pressure upon one side or the other of said orifice, which is very difficult and in some cases impossible.

In Fig. 1ᵃ I have shown a modification of the apparatus inclosed in the broken and dotted lines in Fig. 1. The apparatus shown in Fig. 1ᵃ is adapted to be substituted for the apparatus in such lines in Fig. 1. The pipe 77' would then be connected to the upper end of 77 and pipe 85' connected to the upper end of 85.

In the modification shown in Fig. 1ᵃ a proportional flow of the compressible fluid passes from the cell 67 thru the duct 77' to a cell 78'. The cell 78' communicates with a cell 95' thru a channel 2'. A duct 85' leads into the cell 78' thru a valve 3' controlled by a float 69'. The liquid passes thru the duct 85' and the valve 3', the cells 78' and 99' and out through the orifice 4'. A tube 101' is connected to the chamber 95' into which the liquid rises to indicate the pressure and changes in pressure in the cell 95'. The compressible fluid entering the cell 78' thru the tube 77' escapes thru an orifice 5'. The parts are so proportioned and arranged that when the level of the liquid in the cell 78' is on the same horizontal line with the orifice 4' the valve 3' will be closed. Under these conditions there would be no flow in the conduit 60. When the fluid began to flow in the conduit 60 the pressure in 78' would increase and the valve 3' be opened more or less in proportion to the pressure in 78', permitting liquid to flow thru the duct 85', which would operate the device 86. The rate of flow of liquid thru the device 86 would be in exact proportion to the variations in pressure in the cell 78'.

The desired relation between the flow thru 60 and the flow thru 85' may be determined and maintained by properly proportioning the orifices 4', 5' and 62. This, however, is a matter of mechanical calculation and of dimensions.

Figure 2:
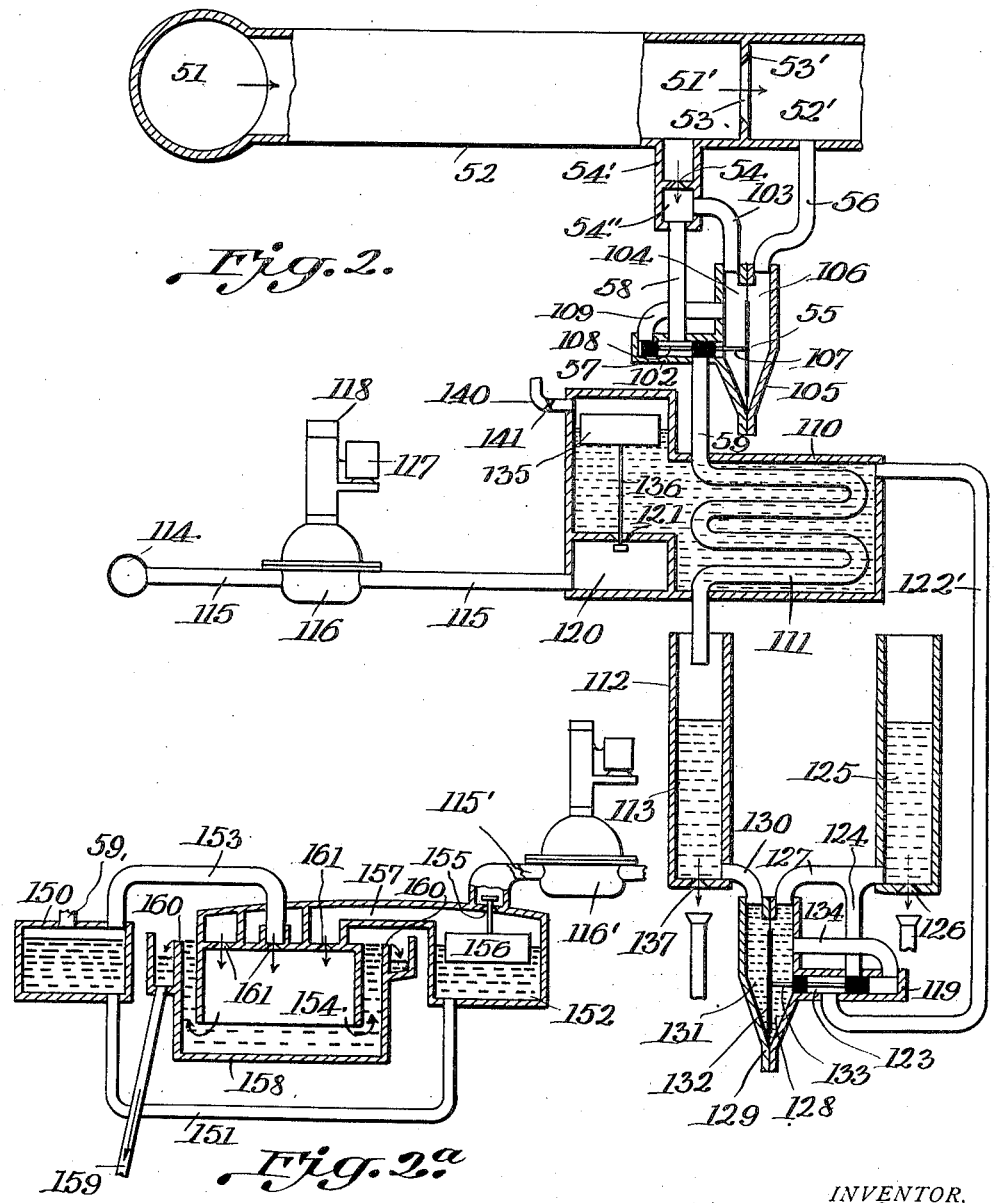

The embodiment shown in Fig. 2 is preferable for some compressible fluid which is condensible, such as steam. The source of fluid to be measured is shown at 51, and a conduit is shown at 52 and at 53 is shown an orifice in said conduit, which in the embodiment shown is formed in a web 53' in the conduit. As will be understood, the pressure at 51' on one side of the web 53' will differ from the pressure at 52' at the other side of said web when there is any flow of the fluid thru the duct. At 54 is shown an orifice in a duct 54' communicating with the conduit 52 at 51'. A duct 58 leads from the side 54'' of the orifice 54 to a valve chamber 102. A second duct 103 leads to a cell 104 of a chamber 105. A duct 56 leads from the side 52' of the orifice 53 to a second cell 106 of the chamber 105. At 55 is shown a movable member, here shown as a diaphragm, between the cells 104 and 106. The member 55 is connected by a stem 107 to a valve 108 in the valve chamber 102. The pressure is maintained equal on both sides of the valve by fluid thru a duct 109 connected to the valve chamber at one end of the valve and to the cell 104 at the other end of the valve. A duct 59 communicates at one end with the valve chamber 102 and passes into a condensing chamber 110 where it may be coiled back and forth, as shown at 111 and thence passes into a receptacle 112, where the condensed fluid is deposited, as illustrated at 113. At 114 is shown a source of liquid from which liquid passes thru a duct 115 and a registering device, such as a meter 116 which may be equipped with a recording device 117 and integrating apparatus 118 of any well known form. The liquid passes thru the duct 115, enters a cell 120 and flows thru a valve 121, when the same is opened, into the condensing chamber 110 and thence outward thru a duct 122' to a valve chamber 119 in which there is a valve 123. When the valve 123 is open the liquid passes thru a duct 124 to a receptacle 125 and out thru an orifice at 126. The pressure of the fluid in 125 is conveyed thru a pipe 127 to a cell 128 of the chamber 129 and pressure from the receptacle 113 is conveyed thru a duct 130 to a cell 131 of the chamber 129. A movable member, such as a diaphragm 132, is provided in the chamber 129 and is connected to the valve 123 thru a stem 133, thru which the valve is controlled by the diaphragm 132. The pressure is maintained equal on the two sides of the valve 123 thru the duct 134. The valve 121 is controlled by a float 135 which is connected to said valve by a stem 136. I may provide at 140 a vent for the chamber 110 in which I may employ a valve 141 for controlling said vent.

The operation of the device shown in Fig. 2 is as follows: The apparatus shown at 55, 57 and the associated parts will create in the duct 59 a flow of the compressible fluid of the duct 52 proportional to the flow in 52, and at the same temperature and pressure, in the manner already described in Fig. 1. This flow passes into the condensing chamber 110 thru the coil 111, where it is condensed and drops in the shape of liquid into the receptacle 112, passing out thru the orifice 137. The pressure of the liquid in 112, however, will be exerted upon the diaphragm 132. The float 135 and the valve 121 maintain sufficient water in the chamber 110 to insure the condensation of the fluid entering thru the duct 59. The pressure in the receptacle 125 will be transmitted, as already explained, to the diaphragm 132 thru the duct 127 and the pressures in the two receptacles 113 and 125 will, thru the diaphragm, regulate the valve 123 to maintain the flow thru the duct 122' proportional to the pressure in the chamber 112, and therefore, proportional to the flow thru the orifice 53. The orifices 126, 137 and 53 may be so proportioned and arranged as to arrive at the desired proportion between the flows thru 122' and 52. By registering or recording the flow thru 122' and knowing the proportion between this flow and that thru 52 an accurate register and record of the flow thru 52 may be obtained.

In the form shown in Fig. 2ª the compressible fluid from the chamber 102 passes thru the duct 59' into a chamber 150, which is connected by a duct 151 to a chamber 152. A portion of each of the chambers 150 and 152 and the duct 151 are filled with mercury. The pressure of the fluid in 150 is exerted upon the top surface of mercury in said chamber. The fluid then passes thru the duct 153 into a space on the under side of a bell 154, where it comes into contact with water and is condensed. The water passing thru the device 116' and the duct 115' passes thru a valve 155 controlled by a float 156 on the surface of the mercury in the cell 152, into such cell and thence thru a duct 157 into the under side of the bell 154, contacting with the fluid from 153 and condensing the same, as already explained. The condensed fluid and the water together pass from under the bell into a chamber 158 over the top edge of the same, and out thru a duct 159, as indicated by the arrows. The points 160, at which the water flows out of the chamber 158, are maintained at the same level as the surface of the mercury in the cells 150 and 152 and as the orifices 161, thru which the liquid and the fluid enter the under side of the bell 154.

In the operation of this device, the pressure of the fluid in the chamber 150 and the liquid in the chamber 152 will be maintained the same, and the valve controlled by the float 156 will so regulate the flow thru the duct 115' that it will be proportional to the pressure in 150 and to the flow thru the conduit 52, all of which will be clear from the previous descriptions.

Figure 3:
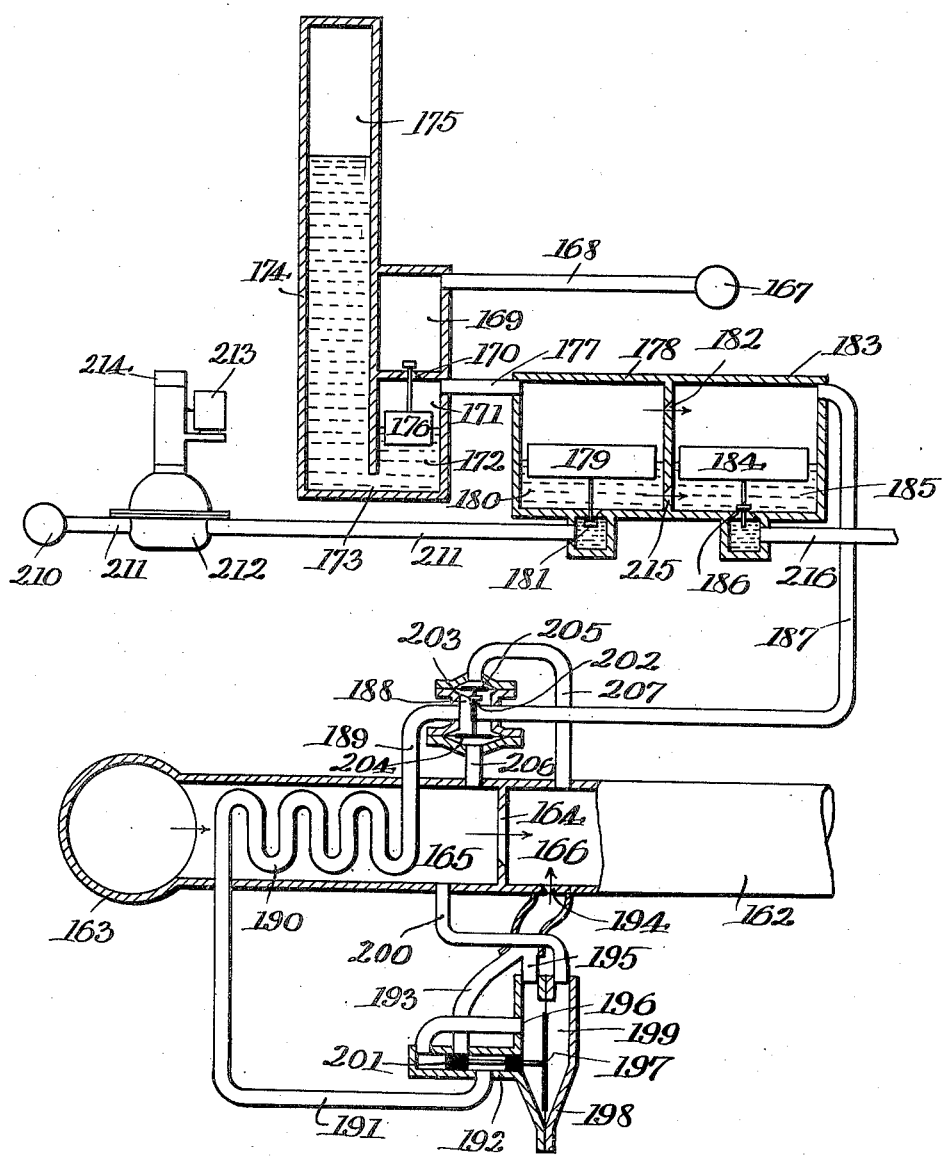
Fig. 3 shows a third embodiment of my invention.

In the embodiment shown in Fig. 3 I have introduced to the conduit a proportional flow of a fluid similar to that flowing thru the conduit and have used said proportional flow to create a proportional flow of liquid which is measured and recorded. The conduit thru which the fluid to be measured flows is shown at 162. The source from which it flows is shown at 163. An orifice 164 is shown in the conduit 162. It will be understood that the pressures at 165 and 166 on the two sides of the orifice 164 will be different. At 167 is shown a source of fluid similar to that which flows from 163. The fluid flows from 167 thru the duct 168 at various pressures and enters the chamber 169, where it flows thru a valve 170 into a chamber 171. The chamber 171 is partly filled with a liquid 172 and communicates thru 173 with a second chamber 174 in which there is a portion of compressible fluid, shown at 175. The valve 170 is controlled by the float 176 on the surface of the liquid 172. Thru the float 176 and the valve 170 the fluid enters the chamber 171 at a constant pressure. The fluid, still at the constant pressure, passes thru the duct 177 to the cell 178, where it presses against a float 179 and the liquid 180 in said cell supporting said float. The float 179 controls a valve 181 whose function will be explained later. The fluid passes on thru an orifice 182 into a chamber 183, where it presses upon a float 184 and the liquid 185 in said chamber supporting said float. The float 184 controls a valve 186 for a purpose to be described. In passing the orifice 182 the pressure of the fluid becomes variable again and in this condition the fluid passes thru the duct 187 into a device 188, which in the manner to be described, will regulate the pressure of the fluid passing thru the device 188 to be approximately the pressure of the fluid passing thru 162, the pressure of the fluid thru 189 being maintained sufficiently above the pressure in 162 for it to continue its operations, which are to be described.

The fluid passing thru 189 passes thru the coils 190, where it is brought to the same, or substantially the same, temperature as the fluid in the conduit 162. From 190 the fluid passes thru 191 into a valve chamber 192 and thru a duct 193 and an orifice 194 into the conduit 162 at 166, the pressure of the fluid being exerted thru a duct 195 in a cell 196 upon a movable diaphragm 197 in a chamber 198. The cell 199 of the chamber 198 on the other side of 197 communicates with the conduit 162 at 165 thru a duct 200. The member 197 controls a valve 201. In a manner which will be well understood from the description of the previous embodiments, it will be seen that the set surrounding the member 197 will maintain the flow thru 191 proportional to the flow thru 162.

Referring now to the device shown at 188, the duct 187 terminates in 188 in an opening 202, which is controlled by a valve 203 connected to two diaphragms 204 and 205. The pressure from 165 is exerted upon one side of the diaphragm 204 thru a fluid duct 206, and the pressure at 166 is exerted thru a fluid duct 207 upon one side of the diaphragm 205.

The operation of this device to maintain an approximately constant ratio of pressure is as follows: If the pressure at 165 increases over that at 166, the valve 203 will be opened more, permitting a greater flow thru 189, and a greater pressure thru 194, which will tend to equalize the pressure between 165 and 166, and of course, the reverse will tend to close the valve 203 with a reverse result. The relative areas and weights of the diaphragms 204 and 205 may be made as desired, producing predetermined results in the pressure reduction effected by the valve 203 functional to the pressure loss thru the orifice 164.

At 210 is shown a source of liquid, such as water, which flows thru a duct 211 and a metering device 212 which may be equipped with a recording device 213 and an integrating device 214. From 212 the duct 211 leads past the valve 181 into the chamber 178 and thru an orifice 215 into the chamber 183 thru the valve 186 and out thru a duct 216. The flow thru 212 will be maintained proportional to the flow thru 164 by the valves 181 and 186 which are controlled by the pressure of the flow proportional to the flow thru 164, which proportional flow, as already explained, passes thru 187 and over the floats 179 and 184, and thru the orifice 182.

Figure 4:
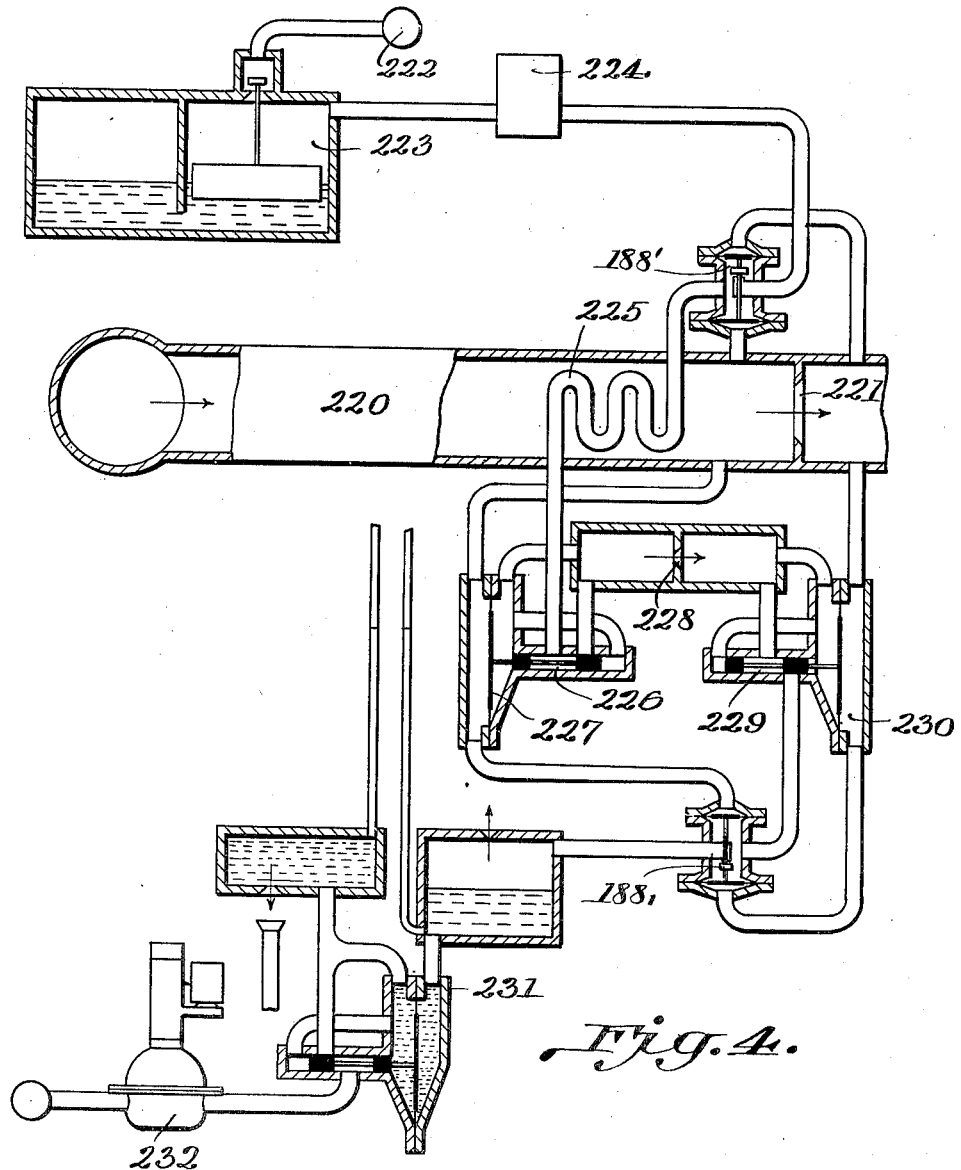
Fig. 4 shows a fourth embodiment of my invention.

In the device shown in Fig. 4 the proportional flow of fluid instead of being taken from or introduced to the main conduit, is simply conducted parallel to the conduit. In this embodiment the main conduit is shown at 220 and the fluid passes thru an orifice 221. The source of the proportional flow is shown at 222. Such flow is brought to a constant pressure by the apparatus shown at 223, whence it passes thru a meter 224.

A roughing throttle device, such as described in connection with Fig. 3, is shown at 188' and thence the liquid passes thru a temperature coil 225, thru the valve 226 of a regulating device 227, which brings the pressure on the approach side of the orifice 228 equal to the pressure on the approach side of the orifice 221. It thence passes thru the valve 229 of a regulating device 230, which regulates the pressure on the discharge side of the orifice to maintain it equal to the pressure on the discharge side of the orifice 221. The proportional flow of gas passes thru a second roughing throttle 188', whence it may be passed thru a liquid regulating device, shown generally at 231, which regulates the flow of liquid thru an indicating device 232, so that it will be proportional to the flow of gas thru the main 220.

The detailed operation of the apparatus of Fig. 4 will be well understood from the description of the operations of the embodiments described supra.

Figure 5:
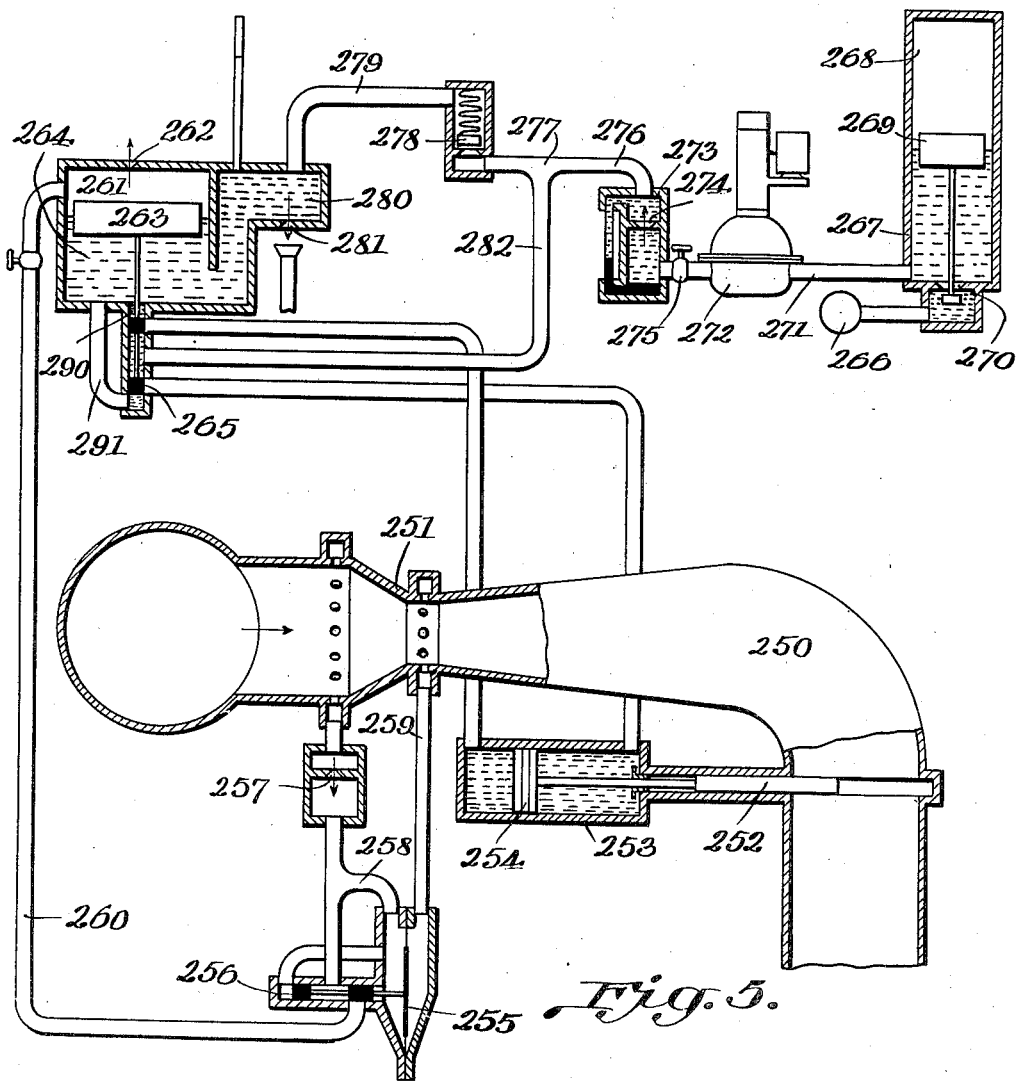
Fig. 5 shows a fifth embodiment of my invention.

Fig. 5 shows apparatus not only for creating a proportional flow of gas, but for automatically regulating the flow thru the main conduit. The main conduit is shown at 250. A venturi 251 is shown in this conduit. Means are shown for regulating the flow thru the conduit, here shown as a gate valve 252, which is controlled by a proportional flow of fluid thru any suitable means, such as a hydraulic cylinder and piston, the cylinder being shown at 253 and the piston at 254. At 255 is shown a valve controlling device which controls a valve 256. The pressure in the main at the full section of the main is conveyed, as modified by the orifice 257, to one side of the member 255 thru the duct 258 and the pressure in the main at the throat of the venturi is conveyed thru the duct 259 to the other side of 255. This apparatus will maintain thru the duct 260 a flow of fluid proportional to the flow thru the main 250 in a manner which will be well understood, as a result of the description of devices similar to 255 made supra. The fluid passes thru 260 into a chamber 261, and out thru an orifice at 262 to the atmosphere, acting in the chamber 261 upon a float 263 and the surface of a quantity of liquid 264 in said chamber. The float 263 controls a valve 265 which regulates the flow of liquid to the cylinder 253. The liquid originates at a source 266, passes thru a chamber 267 at the top of which there is a compressible fluid under any desired constant pressure. This is shown at 268. A float is shown at 269 on the surface of the liquid in 267, which float controls a valve 270 regulating the flow of fluid thru the chamber 267 and the duct 271 to maintain a constant pressure in 267. The liquid flows thru a metering device 272, a valve 275, an orifice 274, a manometer 273 having a take-off on each side of this orifice, indicating the loss of pressure thru the orifice, and therefore, the rate of the flow of the liquid into the duct 276. At a junction point 277 this flow divides, a portion of it passing thru a relief valve 278 and thence thru a duct 279 into a chamber 280 connected with the chamber 264 and out thru an orifice 281. The other portion of the flow passes thru a duct 282 to the chamber of the valve 265 and thence, according to the position of said valve, into one portion or the other of the piston chamber 253 to operate the piston 254 in a well known manner. The waste from the cylinder 253 will pass to the chamber 264 either at 290 or thru the duct 291, so that all of the flow passing thru 276 will pass thru the orifice 281.

The function of the pressure relief valve 278 is to maintain on its approach side a sufficient pressure for the operation of the hydraulic piston 254, as described. It will be seen that whenever there is a change in the rate of flow in the main 250, a corresponding change in the flow thru 260 will be effected, and the position of the valve 265 will be correspondingly changed to cause water to flow to one side or the other of the piston 254, so as to change the position of the gate valve 252 and to maintain the gas pressure on the orifice 262 equal to the water pressure acting on the orifice 281, and it will be seen, therefore, that the regulation of the flow of water passing thru the valve 275 by said valve, as indicated by the manometer 273, will act to regulate the flow thru the main 250 proportional thereto.

While I have illustrated and described these particular forms of my invention and the particular details of apparatus illustrated therein, this has been done for the purpose of better explaining my invention. It will readily be understood that many departures may be made from the forms and details illustrated, without departing from the spirit of the invention.

I claim:—

1. The method of measuring the flow of a compressible fluid flowing through a conduit at various temperatures and pressures, which consists in creating a flow of a similar fluid at the same or substantially the same temperatures and pressures as the flow in the conduit, maintaining said created flow proportional to the flow in the conduit, bringing said proportional flow to a constant temperature and pressure and measuring said proportional flow when at such constant temperatures and pressures.

2. The method of measuring the flow of a compressible fluid flowing at various pressures and temperatures thru a conduit, which consists in creating from said flow a flow of a similar fluid at the same or substantially the same temperatures as the flow in the conduit, maintaining said created flow proportional to the flow in the conduit, bringing said proportional flow to a constant temperature and pressure and measuring said proportional flow when at such constant pressures and temperatures.

3. The method of measuring the flow of a compressible fluid at various temperatures and pressures flowing thru a conduit, which consists in creating a flow of a similar fluid at the same or substantially the same temperatures and pressures as the flow in the conduit, maintaining said created flow proportional to the flow in the conduit, bringing said proportional flow to a constant temperature and pressure and measuring said proportional flow when at such constant pressure and temperature.

4. In a fluid system, means for measuring the flow of a compressible fluid flowing at various pressures and temperatures through a conduit, comprising means adapted to create from said flow a flow of a similar fluid at substantially the same temperatures as the flow in the conduit, means for maintaining said created flow proportional to the flow in the conduit, means for bringing said proportional flow to a constant temperature and pressure and flow measuring apparatus, said apparatus being so disposed as to be variably operated according to the amount of said proportional flow when at such constant temperature and pressure.

5. In a device of the class described, the combination of a duct thru which a compressible fluid flows, said fluid being at various temperatures and pressures, means including a movable member for creating a flow of a similar fluid at substantially the same temperatures and pressures and maintaining said flow proportional to the flow thru the conduit, mechanism for bringing said proportional flow to a definite temperature and maintaining the temperature thereof constant, apparatus for bringing the proportional flow to a definite pressure and maintaining its pressure constant and metering means whose actuation is controlled by the proportional flow thus reduced to constant temperature and pressure.

6. The method of regulating a gas flow, which consists in establishing a flow of said gas at any varying pressure, in establishing a flow of a liquid, in bringing said flows of gas and liquid to a common constant predetermined pressure at points in line of such flows, in so retarding the flow at said points of common constant pressure that at a predetermined ratio of said flows equal pressure reduction will be created, and maintaining the two pressures equal to one another at said points of pressure reduction.

7. In a fluid system, the combination of a fluid conduit thru which a compressible fluid flows at various temperatures and pressures, a duct and mechanism controlled by the flow of fluid in the conduit for creating a proportional flow of fluid in said duct at substantially the same temperatures and pressures as the flow in the conduit, said mechanism including movable means and devices to cause the pressure of the fluid both in the conduit and the duct to act upon said means and maintain the pressures equal to one another, second movable means affected by the pressure in said duct to automatically maintain the pressure constant in a section of said duct and means to create another fluid pressure and to cause the same to act upon said second movable means to maintain the pressures acting upon said second named movable means equal and measuring apparatus controlled by the flow of fluid thru the duct.

8. The method of regulating a flow of a compressible fluid, consisting in creating a constant pressure of another fluid, causing one fluid pressure to act against the other fluid pressure to establish an equilibrium of pressure when the said pressures are equal and governing the pressure of the compressible fluid to maintain it equal to the pressure of said constant pressure fluid by departures from equilibrium of the two opposing pressures.

9. In a fluid system, means to regulate the flow of a compressible fluid, comprising a discharge member, means to maintain the pressure of the fluid on one side of the said discharge member from which the fluid is passing constant, said means comprising a movable member affected by the pressure of said compressible fluid, means for supplying a non-compressible fluid at the required constant pressure, said movable member being also adapted to be affected by the pressure of the non-compressible fluid.

10. The method of measuring a compressible fluid, which consists in discharging said fluid against a constant pressure acting upon a movable member by the pressure required to effect such discharge, and of acting upon said movable member also by another fluid pressure governing said pressure equal and maintaining it equal to that of the compressible fluid, causing said other fluid pressure to create a fluid flow and measuring said fluid flow.

11. The method of maintaining a fluid at constant pressure, consisting in providing a second fluid, exerting a constant pressure of the desired value and causing the second fluid pressure to oppose the first fluid pressure and variably governing a fluid flow to dominate the first fluid pressure according to the difference in opposing fluid pressures.

12. The method of maintaining a constant pressure at a designated point in a line of a fluid flow, which consists in governing said pressure at such designated point thru the regulation of pressure absorption at another point in a line of said flow and acted upon by the pressure at said designated point and by another constant fluid pressure equal to the required constant pressure at said designated point.

13. The method of maintaining a fluid pressure constant, which consists in providing another fluid at the desired constant pressure and causing this pressure to re-act against the pressure of the fluid whose pressure is to be governed and of obtaining a balance of both of said opposing pressures only when they are equal and governing a fluid flow which dominates said first named fluid pressure, by overbalancing of re-acting fluid pressures.

14. The method of regulating the flow of a compressible fluid, which is variable in pressure, which consists in producing a functional flow of a similar fluid at the same pressure, reducing said functional flow to a constant pressure and utilizing said functional flow at the constant pressure to regulate the first named flow.

15. The method of measuring the flow of a compressible fluid which is variable in pressure, which consists in producing a functional flow of a similar fluid at the same pressure or substantially the same pressure, bringing said functional flow to a constant pressure and utilizing said functional flow at such constant pressure to effect the measurement of the first named flow.

16. The method of measuring and regulating the flow of a compressible fluid whose pressure is variable, which consists in producing a functional flow of a similar fluid at the same or substantially the same pressures as the first named flow, bringing said functional flow to a constant pressure and utilizing said functional flow at the constant pressure to effect the measurement and regulation of the first named flow.

17. The method of maintaining equality between a liquid and a gas pressure, one of which pressures is variable, consisting in controlling the liquid level by the balancing of opposing gas and liquid pressures and variably controlling the unvarying pressure according to variations in liquid level to restore the predetermined liquid pressure.

18. In a fluid system, the combination of a conduit thru which fluid flows, means to create an orifice in said conduit intermediate its ends, a duct connected to said conduit on the high pressure side of said orifice, a pressure cell to which said duct leads, means creating an orifice in said duct between the conduit and the chamber, a second cell and a second duct leading from said second cell to said conduit and communicating therewith on the low pressure side of said orifice, means to place said cells in communication, a quantity of liquid heavier than the fluid flowing thru the conduit in said cells and adapted to pass thru said intercommunicating means, the walls of the first cell being provided with an orifice thru which the fluid may escape, a float in the liquid of said second cell, a valve controlling said last named orifice controlled by said float, a third duct thru which may flow the fluid passing thru said last named orifice, a chamber to which said duct is connected, an orifice in the walls of said chamber communicating with the atmosphere, a second chamber communicating with the first chamber, movable means in said second chamber dividing the same into two compartments, a quantity of liquid in the said first chamber, one of said compartments and the means placing the same in communication, a third cell and means to place said third cell in communication with the other of said compartments, a source of fluid pressure, a duct connected with said source and leading to said last named cell, a valve controlling said duct governed by said movable means, means whereby fluid may escape from said third cell and means for measuring the flow of fluid thru the last named duct.

19. In a fluid system, the combination of a fluid conduit thru which fluid under pressure flows, means creating an orifice in said conduit, a duct communicating with said conduit on the high pressure side of said orifice, mechanism to maintain the flow of fluid in the conduit proportional to the flow in said duct including a valve in said duct, a pair of cells, one communicating with the conduit on the high and the other communicating with the conduit on the low pressure side of said orifice and means controlled by the fluid pressures in said cells governing said valve, a chamber to which said duct leads and apparatus to permit the fluid to escape from said chamber at a constant pressure, a source of fluid pressure, a duct connected with said source, measuring apparatus in said duct, a third cell to which said duct leads, a valve in said duct and devices controlled by the fluid pressures in said chamber and said third cell for regulating said valve, said third cell being provided with an orifice thru which the fluid therein may escape to the atmosphere.

20. In a fluid system, the combination of a main conducting a flow of gas, mechanism to create and maintain an auxiliary flow proportional to the first flow, means for creating a liquid flow, a valve controlling said liquid flow, means controlling said valve, apparatus to transmit to said means the pressure of the auxiliary gas flow, a reservoir into which the liquid flows and apparatus to transmit to said means the pressure in said reservoir.

21. In a fluid system, the combination of a conduit thru which gas flows under various temperatures and pressures, mechanism including a duct, a valve in the duct and apparatus governing the valve for creating a second flow of gas and maintaining it at the same or substantially the same pressures and temperatures as the gas in the conduit, a chamber to which said duct leads provided with an opening thru which the gas flowing thru said duct escapes to the atmosphere, a movable member, means to convey the pressure in said chamber to one side of said movable member, a source of pressure, means to convey pressure from said source to the other side of said movable member and a device controlling the pressure in said source governed by said member.

22. In a fluid system, the combination of a conduit conducting a flow of gas at various pressures, a duct conducting a flow of gas, means for causing the flow in the duct to be proportional to the flow in the conduit, means associated with said duct provided with an opening thru which the gas flowing thru the duct escapes against a constant gas pressure, a source of liquid pressure, means to supply liquid to said source, a valve controlling said liquid supply means, a movable member controlling said valve, and apparatus to transmit to opposite sides of said movable member the pressure in said source and the pressure in said duct.

23. In a fluid system, the combination of a conduit thru which compressible fluid flows at different pressures, a duct thru which compressible fluid flows, means to maintain the flow of fluid in the duct proportional to the flow in the conduit, a pipe conducting a fluid flow, a valve controlling the flow thru the pipe, movable means governing said valve and controlled by the pressures of the fluids in said duct and pipe, and mechanism actuated by the flow of fluid in the pipe.

24. In a fluid system, the combination of a fluid conduit conducting a compressible condensible fluid, means to create a flow of compressible condensible fluid proportional to the flow in the conduit and maintain the second flow proportional to the first, apparatus to cause the condensation of the fluid constituting the second flow, a receptacle in which the condensed flow is deposited, a movable diaphragm, means to transmit the pressure of the condensed fluid to one side of said diaphragm, mechanism to create a third flow of fluid, a valve controlling said third flow governed by said diaphragm, means to transmit pressure from the fluid of the third flow to the other side of the diaphragm and apparatus actuated by the fluid of the third flow.

25. In a fluid system, the combination of a conduit conducting a flow of compressible condensible fluid, means to create a flow of condensible compressible fluid proportional to the flow in the conduit and maintain it proportional thereto, apparatus to cause a condensation of the second flow, a third flow of fluid, mechanism to maintain the third flow proportional to the flow in the conduit, including a valve controlling the third flow, a diaphragm governing the valve and acted upon by the pressure of the condensed fluid and the fluid of the third flow and means actuated by the third flow of fluid.

26. In a fluid system, the combination of a conduit for conducting a flow of fluid flowing at different rates, mechanism to create a flow of condensible gas functional to the flow in the conduit, apparatus to cause the condensation of said gas, a receptacle into which the condensed fluid is deposited, a diaphragm and means to transmit the fluid pressure in said receptacle to one side of said diaphragm, means to create a third fluid flow, a valve governed by the diaphragm and controlling the fluid flow, a second receptacle thru which the third flow passes, means to transmit the pressure from the second receptacle to the other side of the diaphragm and apparatus actuated by said third flow.

27. In a fluid system, the combination of a fluid conduit conducting a flow of fluid at different rates of flow, means governed by the fluid in the conduit for creating a flow of condensible gas proportional to the flow in the conduit and maintaining such flow proportional thereto, mechanism for condensing such gas, a third flow of fluid and apparatus for maintaining the third flow proportional to the rate of condensation of such gas and apparatus actuated by the third flow.

28. In a fluid system, the combination of a conduit conducting a flow of fluid, means creating an orifice therein, a second conduit conveying a second fluid flow, a valve controlling the second flow, a pair of diaphragms controlling said valve, a device rigidly connecting said valves together, means to transmit fluid pressure in the second conduit to said diaphragms and means to transmit the fluid pressure from opposite sides of said orifice to said diaphragms.

29. In a fluid system, the combination of a conduit conducting a flow of fluid, means creating an orifice in said conduit, a second conduit conducting a second fluid flow, apparatus including a pair of diaphragms controlling the second fluid flow, means to transmit fluid pressure to each of said diaphragms and to adjacent sides thereof, means to transmit fluid pressure from one side of said orifice to the opposite side of one of said diaphragms from which pressure is applied from the second conduit and means to transmit fluid pressure from the other side of said orifice to the other diaphragm and to the side thereof opposite the side to which pressure is applied from the second conduit.

30. In a fluid system, the combination of a fluid conduit conveying a fluid flow and provided with an orifice thru which such fluid flows, a second conduit provided with an orifice thru which fluid flows, a valve controlling the orifice in the second conduit, a diaphragm chamber, two diaphragms in said chamber forming three cells therein, a first cell between the diaphragms, a second cell on the opposite side of one diaphragm from the first cell and a third cell on the opposite side of the other diaphragm from the first cell, means to connect said diaphragms together so that they move simultaneously and pressure from one is transmitted to the other, said diaphragms controlling said valve, the fluid pressure in the second conduit being transmitted to the first cell and means to transmit fluid from the approach and discharge sides of the orifice in the first conduit to the first and third cells respectively.

31. In a fluid system, the combination of a conduit conducting a flow of compressible fluid, a source of compressible fluid and a duct for conducting fluid from said source to said conduit, means for maintaining the flow in the duct functional to the flow in the conduit, apparatus conducting a liquid flow, mechanism governed by the flow in the duct for maintaining such liquid flow functional to the fluid flow in the duct and apparatus actuated by the liquid flow.

32. In a fluid system, the combination of a conduit thru which fluid flows, a valve controlling the flow thru the conduit, a duct, mechanism controlled by the fluid in the conduit for establishing in the duct a flow of fluid proportional to the flow in the conduit and maintaining it proportional thereto, means to conduct another flow of fluid, and apparatus governed jointly by the fluid of the last named flow and the flow in the duct controlling said valve.

33. In a fluid system, the combination of a conduit thru which liquid flows, a duct thru which gas flows, said duct leading to said conduit, means controlling the flow in the conduit governed by the gas pressure in the duct and means governed by the liquid pressure in the conduit controlling the gas flow in the duct, said means maintaining said gas and liquid flows proportional to each other.

34. In a fluid system, the combination of a conduit conducting a liquid flow, a valve in said conduit, a duct conducting a gas flow to the liquid flow, a valve in said duct, means governing the first named valve including a pipe to transmit pressure from the duct, and means governing the second named valve for transmitting pressure from the conduit whereby the flows in the duct and conduit are maintained proportional to each other.

35. In a fluid system, the combination of a conduit conducting a liquid flow, a Venturi tube in said conduit, a duct conducting a flow of gas adapted to be introduced to the liquid flow, means providing an orifice in said duct, the throat of the venturi being connected to the discharge of said orifice, a valve controlling said duct and apparatus controlling said valve governed by the pressure on the approach to said venturi.

36. In a fluid system, the combination of a fluid containing vessel, a movable member therein exposed to the opposed pressures of two different fluids having adjacent surfaces, an additional source of pressure, apparatus to cause one of these two fluid pressures to react against a pressure, and means operated by the movable member to govern one of said fluid pressures to maintain it equal to the other at their adjacent surfaces.

37. In a fluid system, the combination of a fluid containing vessel, a movable member therein exposed to two fluids which have adjacent surfaces and whose pressures are opposed to one another at such surfaces, means to cause one of these two fluid pressures to react against a constant pressure and means including a valve operated by the movable member to govern one of said pressures to maintain it equal to the other at their adjacent surfaces.

38. In a fluid system, the combination of a fluid containing vessel, a movable member therein exposed to the pressures of two fluids of different specific gravities which have adjacent surfaces which are opposed to each other at said surfaces, means to cause one of these two fluid pressures to react against a constant pressure, and means including a valve operated by the movable member to govern one of said pressures to maintain it equal to the other at their adjacent surfaces.

39. In a fluid system, the combination of a fluid containing chamber, sources of fluid pressure and ducts for conveying fluid under pressure from said sources to said chamber, said fluids being of different nature, having contiguous surfaces and being opposed to each other at such contiguous surfaces, a cell containing fluid under constant pressure, and means to cause one of the fluid pressures in said chamber to react against said constant pressure, a movable member in said chamber at the contiguous surfaces of the fluids therein and exposed to the fluid pressures in said chamber, and mechanism controlled by said member to maintain one of said pressures equal to the other at their contiguous surfaces.

40. The method of measuring a flow of fluid, which consists in maintaining a second flow proportional to the first flow, and at its temperature bringing the second flow to a constant temperature and measuring the second flow at such constant temperature.

41. The method of measuring a flow of fluid, which consists in maintaining a second flow proportional to the first flow and at the same pressure, bringing the second flow to a constant pressure and measuring the second flow at such constant pressure.

42. The method of measuring a flow of fluid, which consists in creating a second flow of fluid proportional to the first flow at a common temperature and pressure and maintaining it so, bringing such second flow to a constant pressure and temperature and measuring the same at such constant pressure and temperature.

43. In fluid controlling apparatus, the combination of two adjacent cells having intercommunicating openings at or near the bottoms thereof, one cell being higher than the other, a quantity of fluid distributed between the cells and being part in one cell and part in the other, and adapted to flow back and forth from one cell to another thru the openings, the higher cell being completely closed above the surface of said fluid, a quantity of lighter fluid in the higher cell over the first named fluid, said fluids having adjacent surfaces, a passageway for fluid thru the shorter cell, whereby the fluid in the passageway is in communication with the fluid in the shorter cell, said fluids having adjacent surfaces in the shorter cell, a valve controlling said passageway and a movable member exposed to said fluids at their adjacent surfaces governing said valve.

44. The method of regulating a gas flow, which consists in establishing a flow of said gas at any varying pressure, in establishing a flow of a liquid, in bringing said flows of gas and liquid to a common constant predetermined pressure at points in line of such flows, in so retarding the flow at said points of common constant pressure that at a predetermined ratio of said flows equal pressure reduction will be created, and discharging said gas and said liquid against such retardation against a common pressure into a common flow of a common lower pressure against such discharge.

45. The method of regulating a gas flow, which consists in establishing a flow of said gas at any varying pressure, in establishing a flow of a liquid, in bringing said flows of gas and liquid to a common constant predetermined pressure at points in line of such flows, and by balancing pressures directed from both of said flows against each other, and retarding one flow or absorbing pressure from the other flow which is under greater pressure, to maintain the necessary equality of pressure.

46. The method of measuring a gas flow, which consists in establishing a flow of said gas at any varying pressure, in establishing a flow of a liquid, in bringing said flows of gas and liquid to a common constant predetermined pressure at points in line of such flows, and measuring the resultant liquid flow.

47. The method of measuring a gas flow, which consists in establishing a flow of said gas at any varying pressure, in establishing a flow of a liquid, in bringing said flows of gas and liquid to a common constant predetermined pressure at points in line of such flows, and measuring the resultant liquid flow, in so retarding the flow at said points of common constant pressure that at a predetermined ratio of said flows equal pressure reduction will be created, and discharging said gas and said liquid against such retardation against a common pressure into a common flow of a common lower pressure against such discharge.

48. The method of measuring a gas flow, which consists in establishing a flow of said gas at any varying pressure, in establishing a flow of a liquid, in bringing said flows of gas and liquid to a common constant predetermined pressure at points in line of such flows, and measuring the resultant liquid flow, and by balancing pressures directed from both of said flows against each other, and retarding one flow, or absorbing pressure from the other flow which is under greater pressure, to maintain the necessary equality of pressure.

In witness whereof, I have hereunto signed my name this 1st day of July, 1916.

GEORGE GOODELL EARL.